Patented Feb. 9, 1937

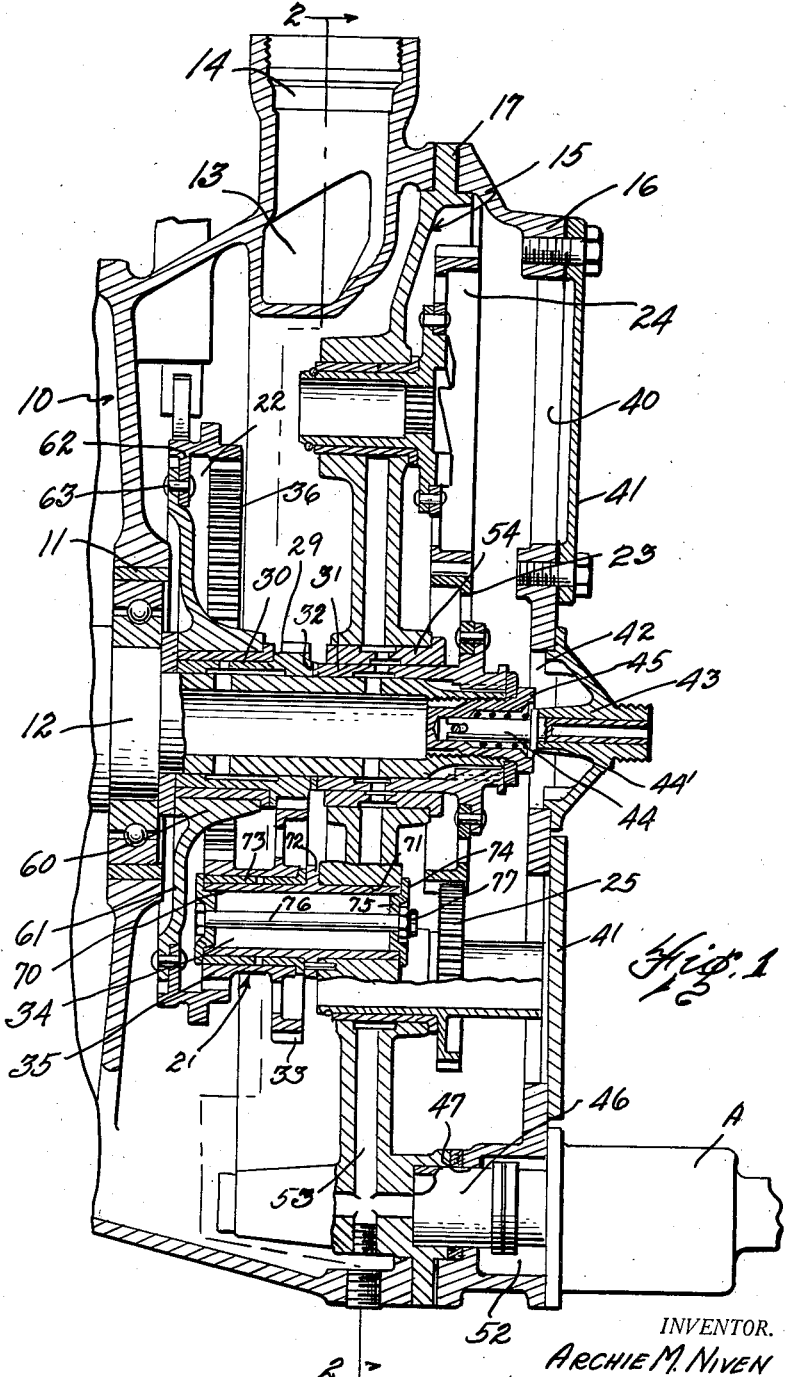

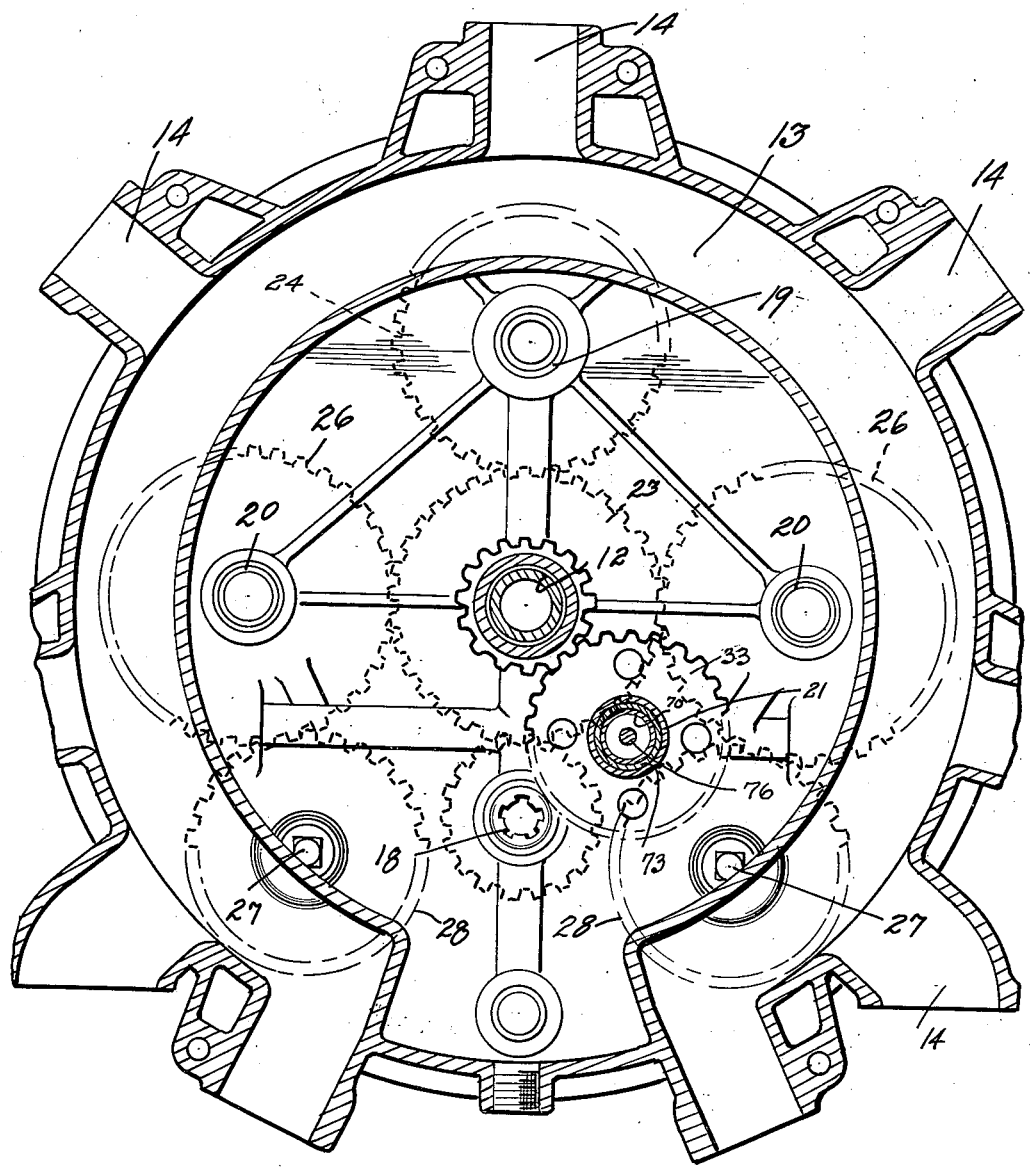

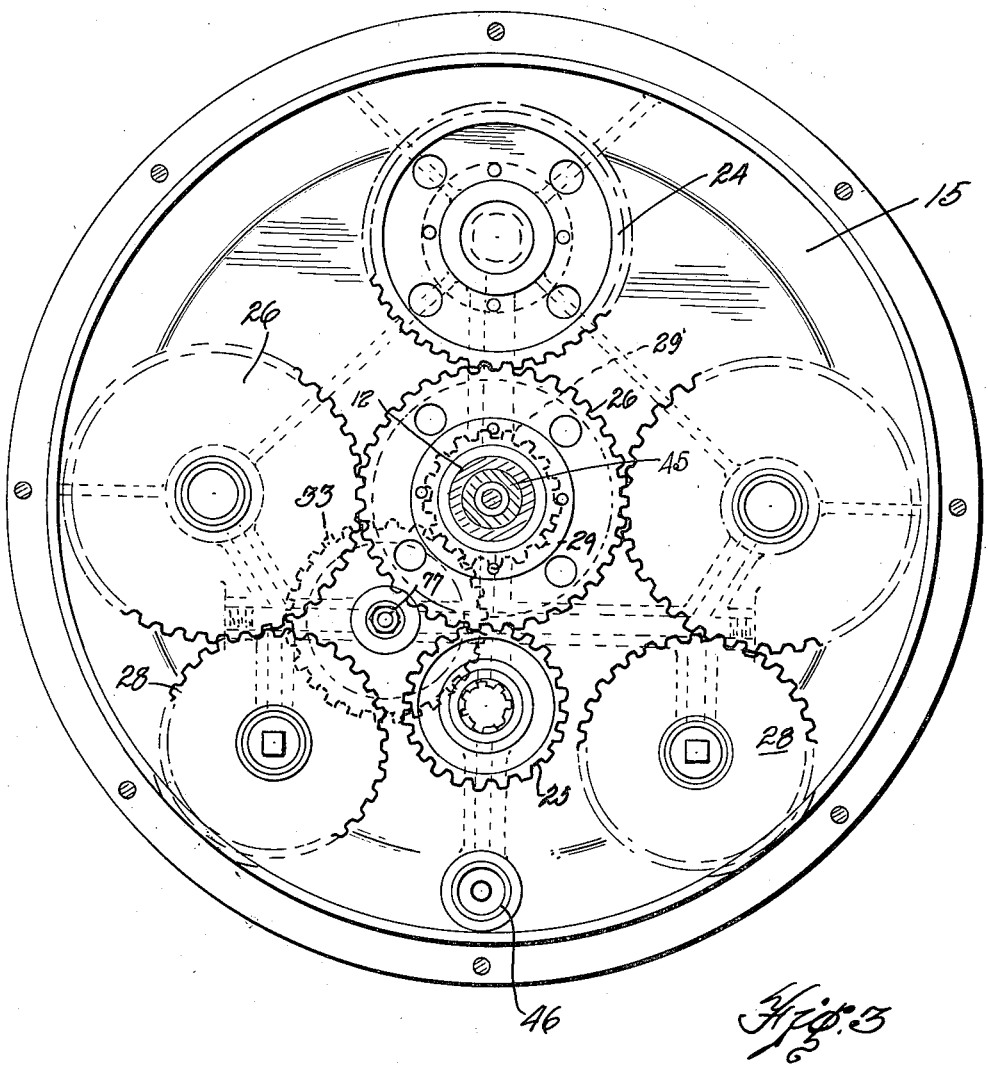

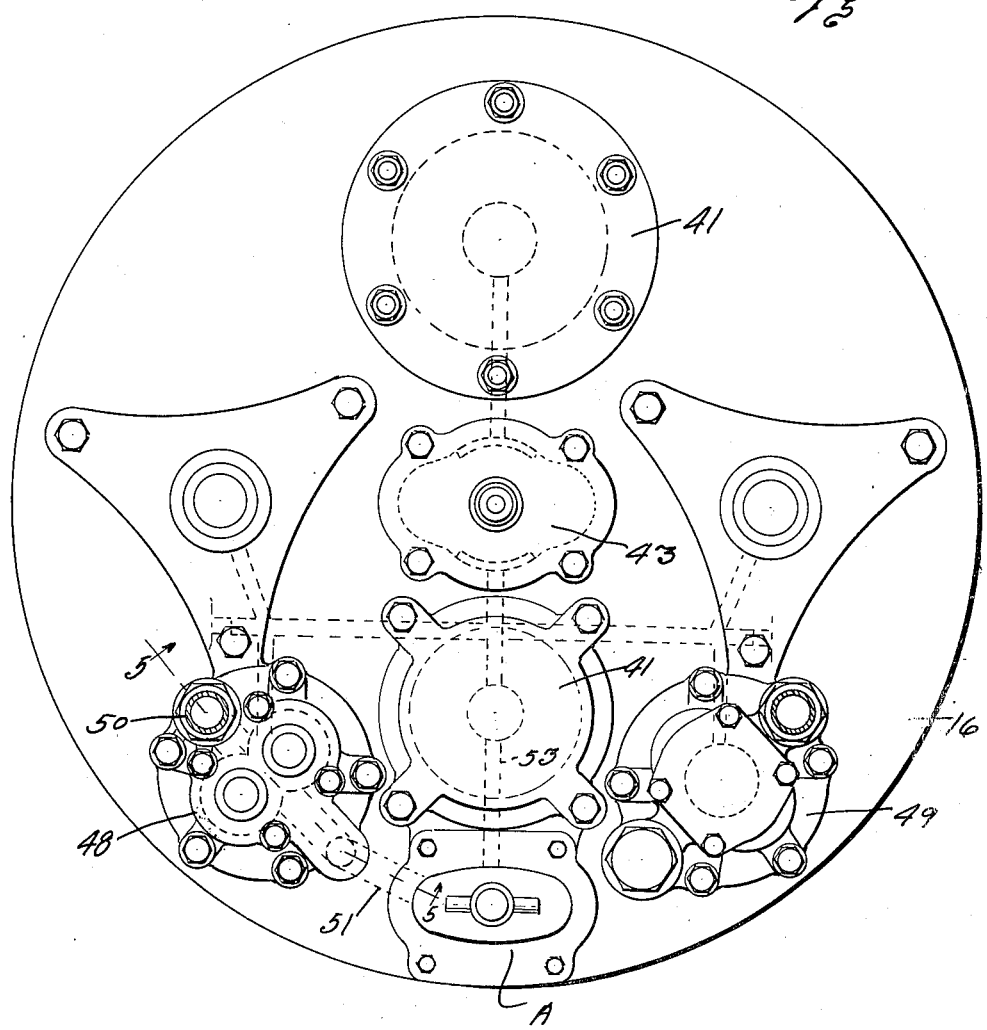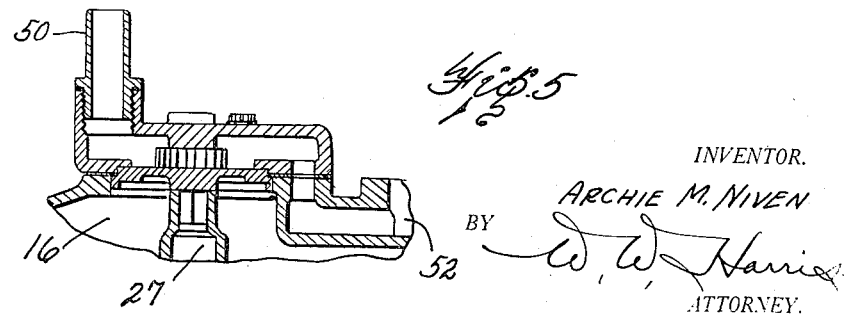

2,069,843

UNITED STATES PATENT OFFICE 2,069,843

INTERNAL COMBUSTION ENGINE

Archie M. Niven, Detroit, Mich., assignor, by mesne assignments, to Continental Motors Corporation, Detroit, Mich., a corporation of Virginia Application November 7, 1929, Serial No. 405,476
Renewed June 8, 1936

2 Claims. (Cl. 123—195)

My invention relates to internal combustion engines and more particularly pertains to an accessory gear case structure for radial air cooled internal combustion engines especially adapted for assembly with aircraft engines, though not exclusively limited to such use, as the principle of my invention may be embodied in engines other than aircraft engines, and in engines other than the radial type.

It is the object of my invention to facilitate the manufacture of a radial aircraft engine by providing a gear case unit therefor, in which the assembly of the accessory driving mechanism therewith is facilitated.

Another object of my invention is to increase the efficiency of a radial aircraft engine by providing an accessory drive mechanism and housing therefor, wherein the various parts or driving mechanisms are more compactly arranged and supported and more efficiently operated, and which may be more efficiently maintained in perfect adjustment with a minimum of time and labor.

A further object of my invention is to decrease the size and weight of a radial air cooled aircraft engine by providing a gear case assembly therefor of reduced size and weight.

A still further object of my invention is to provide a radial aircraft engine of maximum durability and performance by providing a gear case assembly, wherein the various mechanisms contained therein may be more compactly and efficiently supported within the gear case, but which are constructed and arranged relative to each other, so as to permit ready access to be had thereto for inspection purposes or to adjust or replace worn parts.

For a more detailed understanding of my invention, reference may be had to the accompanying drawings which illustrate one form which my invention may assume, and in which:

Figure 1 is a vertical longitudinal sectional view of the rear end of a radial internal combustion engine constructed in accordance with my invention;

Figure 2 is a transverse sectional view taken substantially on the line 2—2 of Figure 1;

Figure 3 is a rear elevation of the engine with the gear case cover or housing removed;

Figure 4 is a rear elevation of the engine with the oil pumps and accessories assembled therewith;

Figure 5 is a sectional view through the oil pump taken substantially on the line 5—5 of Figure 4.

The drawings illustrate an improved rear end construction for use with internal combustion engines, and especially adapted for use with radial aircraft engine, that is provided with a crank case, a rear portion of which is shown and designated by the reference character 10. The crank case is provided with the usual form of bearing 11 for supporting the crank shaft 12, that extends to the rear, and which is adapted to be operatively connected to various accessory driving mechanisms and the like, that are assembled together and preferably contained in the rear part of the engine structure. The rear portion of the crank case as illustrated in Figures 1 and 2 is constructed substantially circular in cross section and is provided with an annular intake manifold 13 extending about the periphery of the crank case adjacent the rear end thereof, said manifold being provided with a plurality of outlets 14 which are adapted to be connected to the intake ports of a plurality of cylinders (not shown). The rear end of the crank case is open and is closed by a dividing wall 15, preferably a separate wall, which is secured to the said crank case, and a gear case cover 16 is preferably secured to the rear end of said crank case for housing the accessory driving mechanism.

The crank shaft 12 is preferably adapted to extend through the dividing wall and to be supported thereby, said crank shaft being operatively connected to a plurality of accessory driving mechanisms located to the rear of the wall as well as to the valve operating mechanism located forwardly of said wall. Due to the fact that the annular manifold carried by the crank case is preferably cast integral with the crank case and extended inwardly of the crank case, it is found that there is a very limited space in which the accessory driving mechanisms, associated with said crank shaft, can be mounted. In aircraft engine manufacture, the weight of the engine is an important item as well as the size of the engine, an engine of the smaller size or dimensions being obviously less in weight.

The structure herein illustrated is constructed to permit a compact assembly of the various parts and mechanisms assembled in the rear structure or gear case of an engine of the radial type, thereby producing an engine structure of relative smaller dimensions with the subsequent relative reduction in weight. This is accomplished by constructing the dividing wall 15 in such a manner as to economically and efficiently utilize the maximum amount of available space in the engine, that is ordinarily wasted, by constructing a wall which is provided with means for supporting the various mechanisms, said supporting means being adapted to lie in the crank case substantially within the boundaries as defined by the front and rear faces of the intake manifold. This dividing wall is provided with a rim 17 adapted to engage the annular rear face of the crank case and to be secured thereto by bolts or other suitable fastening devices. The intermediate portion of the dividing wall is recessed inwardly of the crank case, the plane of the intermediate portion of said wall being offset with respect to the plane of the rim portion, this intermediate wall portion arranged to lie substantially within the boundaries as defined by the front and rear faces of the intake manifold. In order to permit this dividing wall structure to be assembled to the crank case, it is necessary that no gears or other mechanisms be carried on the forward face of the wall, since the intake manifold would interfere with said mechanisms when the wall is positioned or located as described above. Therefore, the wall is constructed to support the accessory driving mechanisms in such a manner, so as to locate these accessory driving mechanisms to the rear of the wall, the wall being provided with suitable bearings, for supporting said driving mechanisms, said bearings being carried by inwardly extending hubs that are projected into the crank case and located within the boundaries as defined by the front and rear faces of the intake manifold.

Referring to Figure 2, it will be noted that the generator and starter gears are supported in bearings 18 and 19 respectively, and the magneto shafts are supported in bearings 20, these bearings all being located forwardly of the wall and within an area bounded by the inner wall of the annular intake manifold 13, thereby utilizing the space interiorly of the annular intake manifold which is ordinarily wasted.

The dividing wall also supports the overhanging valve driving mechanism 21 which is operatively connected with the crank shaft and to the valve cam 22. It will be noted that the dividing wall is constructed to provide an intermediate wall portion that is located relatively close to the valve cam, thereby permitting the use of a relatively narrow cam. The intermediate valve driving mechanism supported by the wall structure is such, that the length of the same is more or less limited. It has been customary in the past to provide a relatively wide cam, in order to bring the internal gear carried by the cam close enough to the wall structure, so that the intermediate valve driving mechanism can be readily engaged therewith. By moving the wall closer to the cam, a cam of less width may be used, by still employing an intermediate valve driving mechanism of no relatively greater size.

The accessory driving mechanisms are preferably all located to the rear of the wall, and driven by a single crank shaft gear 23 that is keyed or otherwise secured to the crank shaft. A starter gear 24 meshes with the crank shaft starter gear 23, and a generator gear 25 is preferably located diametrically opposite to the starter gear and also engaged with said crank shaft starter gear. Gears 26 that are keyed or otherwise secured to the magneto drive shafts are also engaged with the crank shaft starter gear. These gears 23 to 26 inclusive, are arranged substantially in the same plane, said plane being substantially parallel to the plane of the dividing wall by which the gears are supported. The pump shafts 27 are driven by the gears 28, that are keyed to such shafts, and are arranged to mesh with the magneto shaft driving gears 26, these gears 28 being also located substantially in the same plane as the gears 23 to 26 inclusive. These pump shafts are constructed to each drive a rotary oil pump, one pump being designated as the oil pressure pump, that feeds the oil to the engine bearings and parts, while the other pump is utilized for pumping the oil from the crank case to an oil reservoir. (not shown) this pump being known as a scavenging pump.

The crank shaft is provided with an intermediate driving sleeve 30 that is loosely supported thereby and connected to the sleeve 31 carried by the crank shaft starter gear, a releasable clutch 32 being employed to connect the sleeves 30 and 31 together in direct driving relation. A gear 29 is carried by the intermediate driving sleeve 30 and is adapted to mesh with the gear 33 supported by an overhanging sleeve 34 carried by the dividing wall. This gear 33 being constructed as a double gear, the gear 35 preferably integrally constructed with the gear 33 and adapted to engage the internal gear 36 carried by the valve cam. Thus, the valve cam is rotated through the intermediate valve driving mechanism as just described, and is thereby operatively connected to the crank shaft. This intermediate valve driving mechanism is located forwardly of the dividing wall and within the crank case, the same being located only a short distance from the longitudinal axis of the crank shaft and therefore the intake manifold does not interfere in any way with this valve driving mechanism located interiorly of the crank case.

It will be noted, that the accessory drive gears are substantially contained within the recessed or dished portion of the dividing wall, and located in a plane that substantially lies within the limits of the wall and crank case. The crank case cover 16 may thus be constructed of shallow depth, as the same does not carry or support any of the accessory drive mechanisms and is utilized merely to house these mechanisms, that are supported by the dividing wall and located to the rear theerof. The crank case cover is provided with suitable openings 40, that are closed by covers 41, said covers being removed when the accessories are mounted or assembled, such accessories including a starter and a generator, which are not always supplied by the factory that manufactures the engine. The central portion of the gear case cover 16 is provided with an opening 42, in which a tachometer coupling or supporting plate 43 may be mounted. The tachometer is adapted to be directly connected with the end of the crank shaft 12 that extends through the dividing wall, the said tachometer being provided with a shaft 44 that is adapted to be pinned or otherwise secured to a plug 45 secured to the crank shaft. The shaft 44 is provided with an integral flange 44' that bears against a finished face of the tachometer coupling or supporting plate 43 to prevent any oil from creeping into the tachometer along the shaft 44.

In order to correctly position the gear case 16 with respect to the dividing wall, the dividing wall is provided with a rearwardly extending pilot member 46 that is preferably constructed to also support an oil filter "A" that projects through the gear case cover as shown in Figure 1. The gear case is provided with an opening 47 which engages the pilot 46, the gear case when assembled to the engine being positioned by means of this pilot structure.

Figure 4 illustrates an end elevation of the engine, and shows the pressure pump 48 and the scavenging pump 49 secured to the gear case cover 16. The pump 48 is provided with an outlet 50 that is connected to a suitable source of lubricant or oil supply, the oil being pumped through a passageway 51 cast within the gear case cover into an oil chamber or well 52 carried by said gear case cover.

The oil filter is preferably located within the oil chamber 52 and the oil is caused to flow through the filter prior to its entrance into the oil passageways 53 carried by the dividing wall structure. These oil passageways conduct the oil to the various bearings carried by said wall structure, such as the bearing 54 for supporting the crank shaft and the bearings 18 to 20 inclusive, that support respectively the generator shaft, the starter shaft and the magneto shafts. Additional passageways in the dividing wall are provided for conducting oil to the bearing that supports the intermediate valve driving mechanism as well as to the bearings that support the oil pump shafts.

The relatively narrow valve cam is constructed of a hub 60, the forward end of the hub being connected with a flange 61 to which the cam ring 62 may be secured by means of rivets 63 or other suitable securing means. Because of the particular wall structure which locates the wall closely adjacent to the cam, the flange or web 61 is permitted to be located adjacent the forward end of the cam, thereby permitting a relatively narrow cam to be employed.

The intermediate valve driving mechanism is composed of a tube or sleeve 70 that is fitted into a drilled hole 71 in the wall structure, the sleeve being provided with an outwardly extending flange 72, that is adapted to be engaged against the inner or forward face of the wall, this flange 72 being located substantially at the mid-point of the sleeve 70, the sleeve being extended beyond the wall for supporting bearings 73 that support the gears 33 and 35 of the intermediate valve driving mechanism. The sleeve 70 is constructed with open ends, and the caps 74, provided with centrally located depressed portions 75, are attached to the ends of the sleeve 70, the depressed portion 75 being telescoped within the hollow interior of the sleeve 70. It will be noted that these caps have a diameter greater than the diameter of the sleeve 70, so that the outer peripheral rim of the caps engage the wall structure and the bearing 73. A bolt 76 is threaded through these caps and the hollow tube or sleeve 70, and a nut 77, secured to said bolt, is adapted to be screwed down to clamp the bearing 73 to the sleeve 70 and to the wall structure 15.

A further advantage in this construction is the particular mounting of the various driving mechanism by employing bushings of identical construction. Because of the arrangement and assembly of the various accessory driving mechanisms, it is possible to incorporate standard bushings of identical dimensions thereby materially reducing production costs. This standardization of bushings or bearing structures is made possible by the fact that the various driving elements are mounted in the wall structure in the same manner. When such driving mechanisms are mixed up and so mounted as to be positioned in staggered relation to each other; or in other words, to be mounted on both ends of the dividing wall, bushings of different dimensions and structure must be employed. Furthermore the assembly of the driving mechanisms in the same plane permit the assembly of bearings in substantially the same plane and make it possible to provide oil passageways which can be all positioned in the same plane, thereby permitting a more efficient lubrication of the bearings as well as a more economical machining operation in constructing said passageways.

It will be noted that the structure, as described in the above paragraphs, may be economically manufactured; entails a minimum of machine operations; and furthermore, a minimum of time and effort is required to assemble the various driving mechanisms to the engine. In addition to the aforesaid advantages, maintenance of the engine is facilitated because of the ease with which access may be had to the various parts and mechanisms housed within the gear case structure, various parts of the engine, which may become worn, can therefore be very easily replaced or repaired by removing the gear case cover.

My improved engine construction and in particular the rear portion of the engine is relatively shorter in length than any engine construction prior to this time. The arrangement of parts is such that a very compact assembly is made possible and all space is efficiently and economically utilized with the object in view of shortening the engine rear end in order to provide a more efficient and economical manufacture as well as increasing the effectiveness and performance of the engine and facilitating its use with aircraft, because of the large decrease in weight made possible by the reduced dimensions.

Although I have described but one form of my invention, and have described in detail but a single application thereof, it will be apparent to those skilled in the art to which my invention pertains, that various modifications and changes may be made therein without departing from the spirit of my invention or from the scope of the appended claims.

What I claim as my invention is:

1. In an internal combustion engine, the combination of a crank case provided with an intake manifold extending about the periphery and adjacent the rear end thereof, a dividing wall for enclosing the rear end of the crank case and provided with an intermediate portion housed within said crank case substantially within the boundaries as defined by the front and rear faces of the said intake manifold, a crank shaft supported in part by said crank case and extending through said dividing wall, and accessory driving mechanism operatively connected to said crank shaft and including driving elements located to the rear of said dividing wall.

2. In an internal combustion engine, the combination of a crank case provided with an intake manifold extending about the periphery and adjacent the rear end thereof, a dividing wall for enclosing the rear end of the crank case and provided with an intermediate portion housed within said crank case substantially within the boundaries as defined by the front and rear faces of the said intake manifold, a crank shaft supported in part by said crank case and extending through said dividing wall, a plurality of accessory driving mechanisms operatively connected to said crank shaft and supported by said wall, said accessory driving mechanisms located to the rear of said wall and in substantially the same plane, and forwardly projecting hubs carried by said wall for supporting the accessory drive bearings, said hubs projecting into the crank case substantially within the boundaries as defined by the front and rear faces of said intake manifold.

ARCHIE M. NIVEN.